United States Patent [19]

Ahlbrandt

[11] Patent Number: 4,533,523
[45] Date of Patent: Aug. 6, 1985

[54] CORONA TREATER FOR PLASTIC FILM

[76] Inventor: Andreas Ahlbrandt, 17 Uhlandstrasse, Lauterbach, Fed. Rep. of Germany

[21] Appl. No.: 569,264

[22] Filed: Jan. 9, 1984

[51] Int. Cl.³ .................... B01J 19/08; B29C 25/00
[52] U.S. Cl. ............................ 422/186.05; 250/325; 313/39; 361/233; 422/186.08; 422/186.23; 425/174.4
[58] Field of Search ................. 425/178.4; 250/325, 250/326; 204/165, 168; 422/186.05, 186.08, 186.19, 186.20, 186.22, 186.23, 186.26; 313/30, 39, 151, 147; 361/230, 233

[56] References Cited

U.S. PATENT DOCUMENTS

| 2,864,756 | 12/1958 | Rothacker | 250/325 |
| 3,133,193 | 1/1962 | Guillotte et al. | 250/49.5 |
| 3,391,044 | 7/1968 | Kaghan et al. | 361/233 |
| 3,397,136 | 8/1968 | Balogh | 361/233 |
| 3,723,793 | 3/1973 | Komp et al. | 313/355 |
| 3,725,736 | 4/1973 | Bishop | 317/2 |
| 3,736,493 | 5/1973 | Rosenthal et al. | 321/45 R |
| 3,936,635 | 2/1976 | Clark | 250/325 |
| 4,145,386 | 3/1979 | Rosenthal | 264/22 |
| 4,153,560 | 5/1979 | Dinter et al. | 422/186.05 |
| 4,239,973 | 12/1980 | Kolbe et al. | 425/174.4 |
| 4,295,178 | 10/1981 | Spengler | 361/220 |
| 4,402,888 | 9/1983 | Rusck | 264/22 |

FOREIGN PATENT DOCUMENTS 2086144  5/1982  United Kingdom ............... 361/233

OTHER PUBLICATIONS

Corotec–"Treating Station CS1-06-2 with Cavity Electrodes".
Trade Show in Print–"The Ultimate in Corona Treating", p. 58, The End of Treater Rolls?–p. 136.
"Segmented Ceramic Electrode"–A New Dimension in Corona Discharge Treating, by William F. Fogarty.
Corona Treating—A Mechanical Not An Electrical Problem—1984, Extrusion Coating/TAPPI Short Course Notes–pp. 73–78.
Corona Discharge Electrode Concepts in Film Surface Treatment–Society of Plastics Engineers.
Technical Papers 38th Conf. 1980, by Louis A. Rosenthal–pp. 671–674.

Primary Examiner—Willard E. Hoag
Attorney, Agent, or Firm—Barry E. Sammons

[57] ABSTRACT

A corona treater includes an active electrode which has one or more insulated electrode elements slidably supported by an insulating track. A contact spring connects each electrode element to a conductive electrode bar embedded in the track, and sheet material to be treated is fed through a treatment zone created between an active discharge surface on each electrode element and a bare metal roller electrode.

11 Claims, 6 Drawing Figures

CORONA TREATER FOR PLASTIC FILM

BACKGROUND OF THE INVENTION

The field of the invention is corona treater stations, and particularly, the construction of electrodes for such stations.

Corona treater stations for sheets, or webs of plastic materials take many forms. Typically, the material to be treated is fed through a treatment zone in which one surface of the material is bombarded with ions produced by a high voltage alternating electric field. The material is supported in the treatment zone by a conductive roller which also serves as one electrode for the treater. A second, active electrode is supported in the treatment zone and is spaced from the conductive roller equidistantly along its length. For many years the active electrode has taken the form of metal segments which are pivotally attached to a bar, or beam, and which can be selectively swung away from the roller to remove them from the treatment zone. In this manner, the width of the treatment zone can be adjusted to accommodate webs of different widths.

One difficulty with segmented electrodes is that they produce an uneven treatment. This may be caused either by an uneven spacing of the segments from the roller electrode or by changes in the electric field strength at the junction of adjacent segments.

Treater station reliability has been significantly increased recently by employing an elongated active electrode having a coating, or jacket, made of a heat resistant insulating material. Such a structure is disclosed in co-pending U.S. patent application Ser. No. 237,964 filed on Feb. 25, 1981, where the active electrode is constructed from a hollow quartz rod which is filled with a conductive material and which extends the entire length of the roller electrode. While such constructions provide very uniform treatment and do not require an insulating layer on the roller electrode, they are difficult to manufacture. It is difficult to form long tubes of quartz or ceramic materials and it is difficult to fill them with conductive material. Also, the differences in the thermal coefficients of expansion of the insulating rod and its supporting structure make it difficult to mount the rods.

A number of attempts have been made recently to provide a segmented active electrode in which each segment is covered with an insulating jacket. Characteristically, such structures have employed a metal bar or beam which extends along the length of the roller electrode and which supports a series of metal fingers that each extend from the beam toward the roller electrode. In this respect they are very similar to the well known segmented metal electrodes in that the separate metal fingers can be removed or swung away to adjust the width of the treatment zone. The difference is that a jacket of insulating material is slipped over the end of each metal finger to allow bare roll treating. The uneven treatment produced by segmented active electrodes is greatly amplified when the segments are insulated in this manner, and such constructions have not thus far been commercially successful.

SUMMARY OF THE INVENTION

The present invention relates to an insulated active electrode for a treater station which may be segmented for ease of manufacture and for altering the width of the treatment zone. The invention includes a track which is made of an insulating material and which extends along the length of a roller electrode and is spaced equidistantly therefrom, an insulated electrode which is slidably supported by the track, a conductive electrode bar which extends along the length of the track, and a brush contact connected to the insulated electrode and extending outward therefrom into sliding engagement with the electrode bar.

A general object of the invention is to provide an insulated electrode which is easy to manufacture. Rather than constructing a single insulated electrode of great length, a plurality of shorter electrodes may be constructed and slidably mounted side-by-side on the track to provide the desired treatment width. The electrodes may be provided in a variety of lengths and a plurality of brush contacts may be provided along the length of large electrodes.

Another general object of the invention is to provide an insulated electrode which is easy to mount. The insulated electrode slides onto the track where it is firmly supported. No fasteners or bonding agents are required.

Another object of the invention is to provide an electrode in which the spacing from the roller electrode is precisely determined along its length. The track may easily be aligned for equal spacing from the roller electrode and the individual electrodes mounted to the track can be identically molded. The proper number of electrodes can be placed on the track and slid into position in the treatment zone. No fasteners or adjustments are required when electrodes are added or replaced, thus making it a simple and inexpensive task to adjust the width of the treatment zone or replace defective electrodes.

Another object of the invention is to reduce the heat produced inside the electrode. The electrode includes a case made of a heat resistant, electrically insulating material such as quartz or ceramic. This case is shaped to slidably engage the track and retain the electrode in its proper position. A metal plate is contained within the case and is positioned tightly against the inner surface of a bottom wall of the case. The brush contact connects to the plate, but it provides no support function which might dislodge the plate from its tight engagement with the bottom wall. Indeed, the brush contact may be constructed to provide a bias force which promotes tighter engagement of the plate and the bottom wall of the case. This tight engagement ensures that no heat producing ionization occurs inside the electrode.

Yet another object of the invention is to insulate the electrode bar from its surroundings. The electrode bar may be disposed in a slot formed along the length of the track. The electrode bar is thus surrounded on three sides by the insulating material from which the track is made and the exposed surface is covered by the electrode. If electrodes are removed to narrow the treatment zone, the resulting exposed portion of the electrode bar can be covered with an inoperable, insulating segment which slides onto the track.

Still another object of the invention is to provide uniform treatment across the width of the treatment zone. Each electrode is shaped to provide an active discharge surface which is directed toward the roller electrode. The discharge surface is bounded on two opposing sides by end walls which mate with the end walls of adjacent electrodes. These end walls are oriented at an angle with respect to the direction of travel of the material being treated and there is thus no untreated gap at the intersection of the discharge surfaces on adjacent electrodes.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
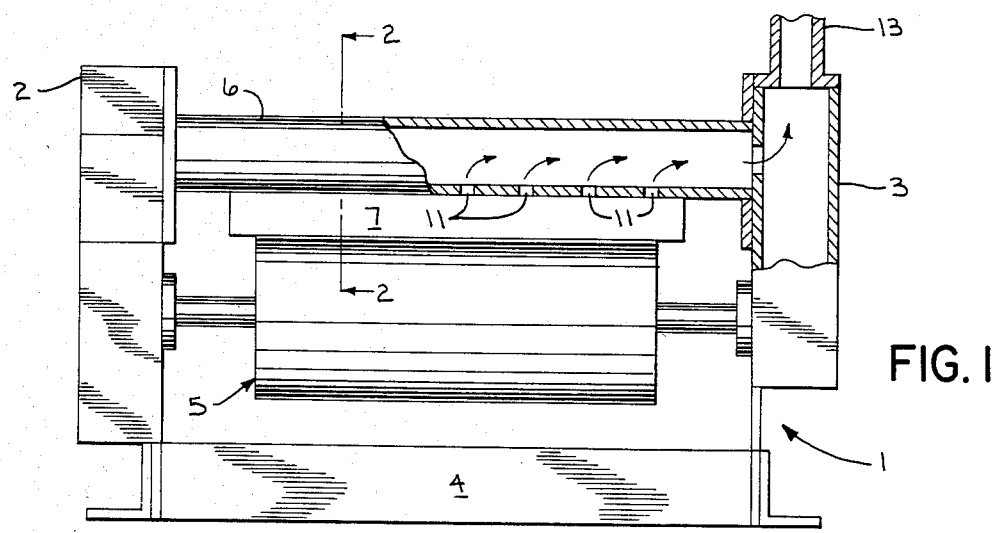
FIG. 1 is a front elevation view with parts cut away of the treater station of the present invention.

Referring particularly to FIG. 1, the treater station is constructed with steel framework 1 which includes a pair of spaced upright side assemblies 2 and 3 supported by a base 4. A circular cylindrical metal roller 5 is supported between the side assemblies 2 and 3 and a web of material to be treated (not shown in the drawings) is fed over the roller 5 causing it to rotate. The roller 5 also connects to one terminal of a high voltage power supply (not shown in the drawings) and it serves as one electrode for the treater station.

Figure 2:
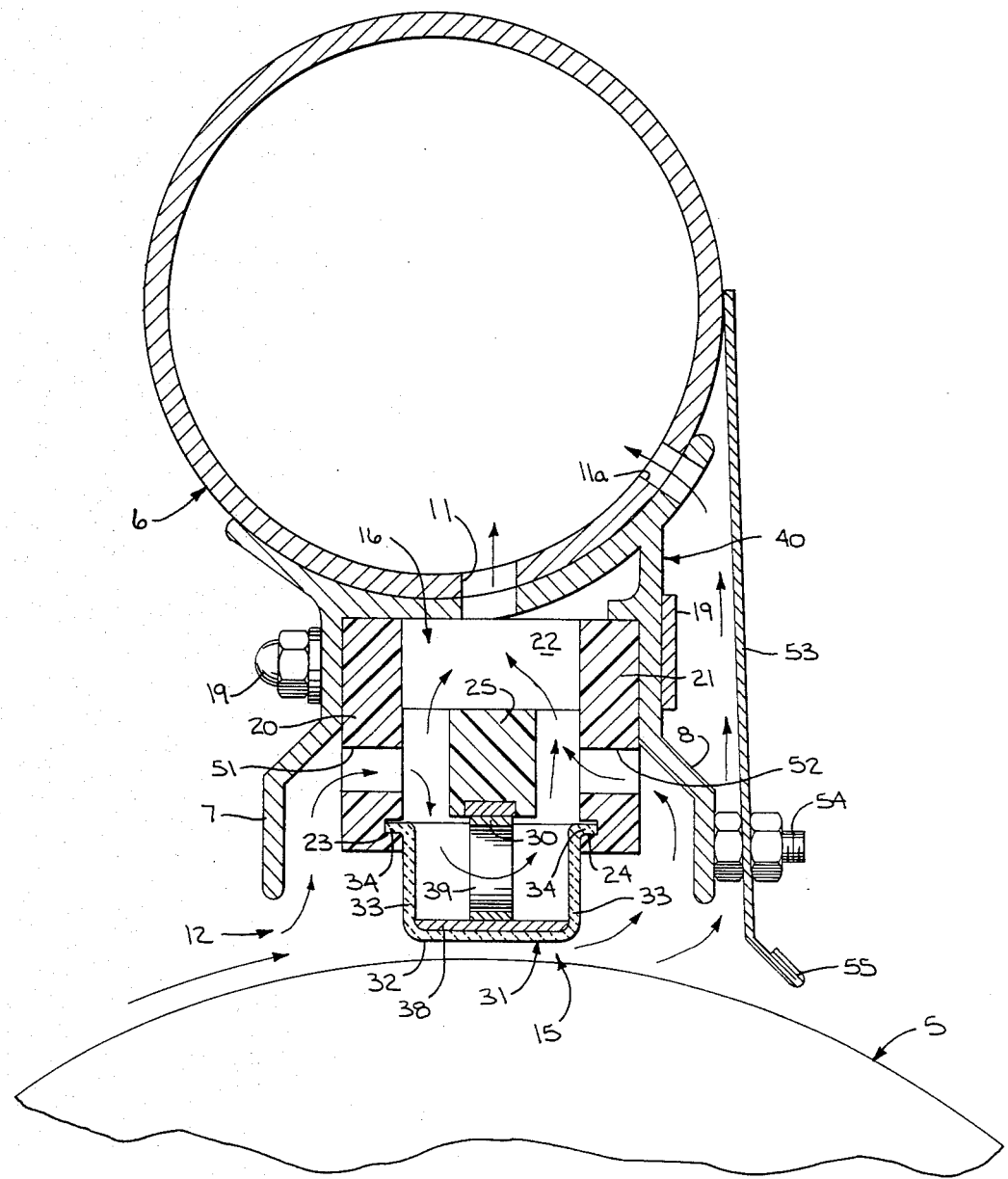
FIG. 2 is a view in cross section taken along the plane 2—2 indicated in FIG. 1.

Referring particularly to FIGS. 1 and 2, also supported by the framework 1 is a header 6 which extends between the side assemblies 2 and 3 and is aligned parallel to the roller electrode 5. The header 6 is formed from an aluminum tube which is rotatably mounted to the side assemblies 2 and 3. A pair of extruded aluminum skirts 7 and 8 are fastened to the header 6, and these are spaced apart to form a passageway, or pipe 10 which extends from the header 6 to the surface of the roller electrode 5. Openings 11 are formed along the length of the header 6 between the skirts 7 and 8, and cooling air flows through these openings from a gap 12 formed between the skirt 7 and the roller electrode 5. As shown best in FIG. 1, this cooling air flows from the openings 11 to one end of the header 6 where it is drawn through the side assembly 3 and into an exhaust vent 13.

As shown best in FIG. 2, an active electrode 15 is disposed inside the pipe 10 adjacent the surface of the roller electrode 5. The active electrode 15 is supported by a track member 16 which extends the full length of the skirts 7 and 8 and which is constructed from an electrically insulating material. The orientation of the track 16 is precisely adjusted to ensure that it is spaced equidistantly from the surface of the roller electrode 5 at all points along its length.

Figure 5:
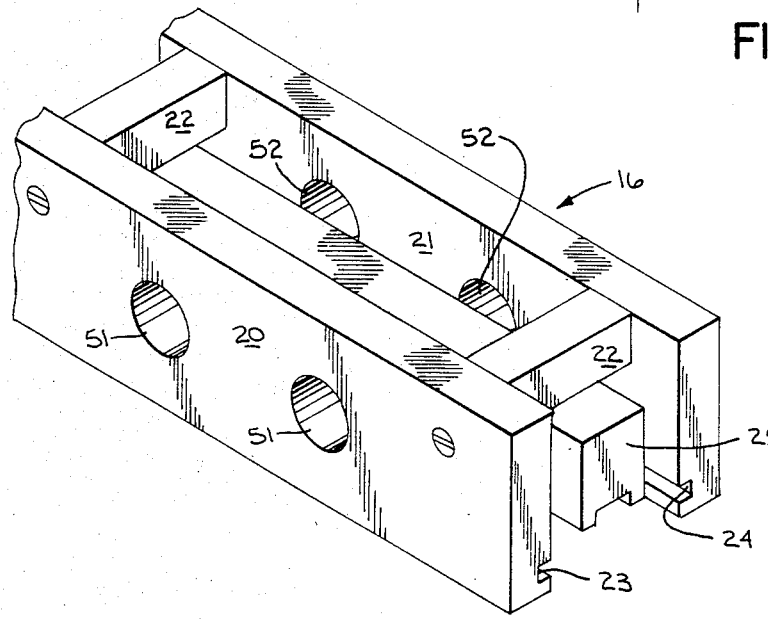
FIG. 5 is a partial perspective view of the track which forms part of the treater of FIG. 1.

Referring particularly to FIGS. 2 and 5, the track 16 includes a pair of spaced rails 20 and 21 which are connected together by a series of cross members 22. The rails are parallel to each other and they are notched on their inner surfaces at 23 and 24 along their entire length. A channel member 25 is fastened to the cross members 22 and is centered between the rails 20 and 21 along their entire length. The entire structure is fastened between the skirts 7 and 8 by bolts 19 which extend through each cross member 22.

The active electrode 15 which is supported by the track 16 is comprised of an electrode bar 30 and one or more electrode elements 31. The electrode bar 30 is made of a highly conductive metal and it is disposed in a recess formed on the bottom surface of the channel member 25. One end of the electrode bar 30 is connected to the high voltage power supply which operates the treater station, and the electrode bar 30 extends along the entire length of the track 16.

The electrode elements 31 are slidably connected to the track 16 and they are disposed side by side along its length. Each electrode element 31 presents a flat discharge surface 32 which is directed towards the surface of the roller electrode 5. The electrode element 31 is retained to the track 16 by a pair of spaced support walls 33 which are shaped to slidably engage the rails 20 and 21. A rib 34 is formed along the upper edge of each support wall 33, and this rib 34 rides in one of the notches 23 or 24 to hold the electrode element 31 in place.

Referring particularly to FIGS. 2 and 5, the track 16 is constructed to provide cooling air to the active electrode 15. A series of openings 51 are formed along the length of the rail 20 and a corresponding set of openings 52 are formed along the length of the rail 21. The cooling air which enters through the gap 12 follows the paths indicated by the arrows in FIG. 2, with a portion of it flowing over the discharge surface 32 of the electrode element 31 and a portion of it flowing through its interior. To enhance the air flow over the active discharge surface 32, a barrier 53 is fastened to the skirt 8 by bolts 54. The barrier 53 extends the entire length of the roller electrode 5 and the spacing between a lip 55 formed along the lower edge of the barrier 53 and the roller electrode 5 may be adjusted to allow passage of the web, but limit the entry of air. Openings 11a formed in the header 6 between the skirt 8 and the barrier 53 further enhance the cooling air flow pattern as shown.

Figure 3:
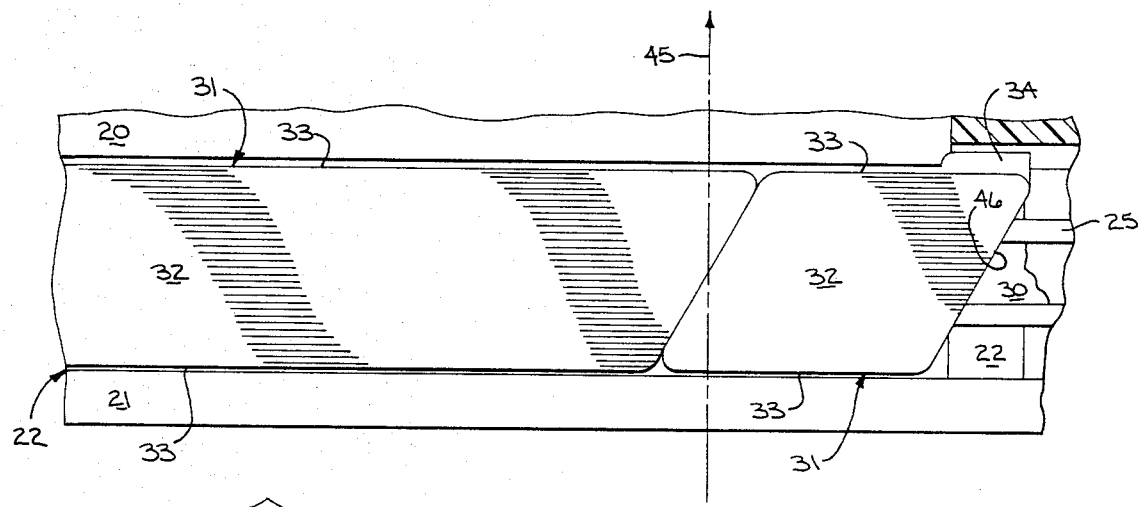
FIG. 3 is a partial bottom view of the active electrode which forms part of the treater station of FIG. 1 and which shows the intersection of two adjacent electrodes.
Figure 4A:
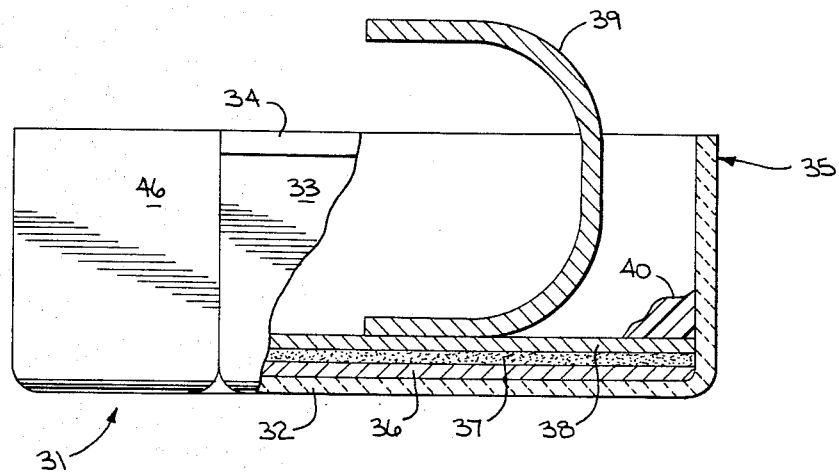
FIG. 4A is a view in cross section through a short electrode taken along the plane 4—4 indicated in FIG. 3.
Figure 4B:
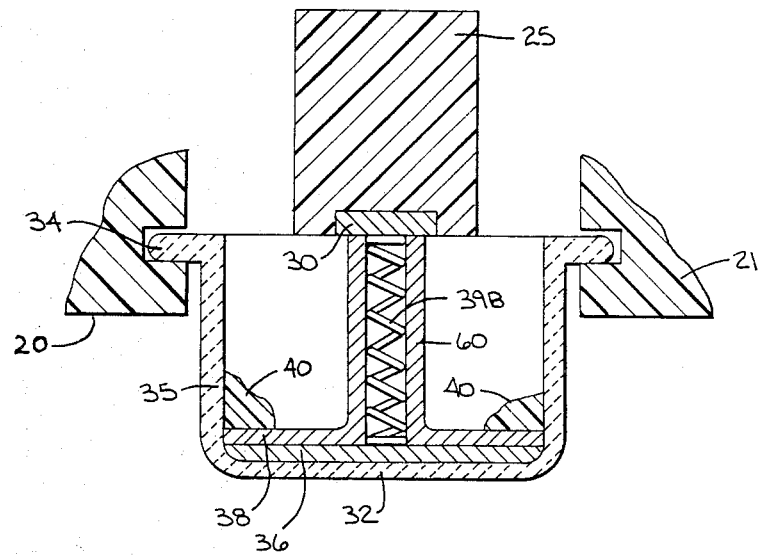
FIG. 4B is a view in cross section through an alternative electrode construction taken along a plane perpendicular to the plane 4—4 indicated in FIG. 3.

Referring particularly to FIGS. 3 and 4, the electrode elements 31 may be constructed in a variety of lengths. For example, a very long electrode element 31 may be used on a corona treater station and a series of short electrode elements 31 may be used at either end. The width of the treatment zone can then be easily adjusted by removing or adding short electrode elements 31 as required. Two separate constructions of the electrode element 31 are described herein. The first construction is shown in FIG. 4A as applied to a short electrode element 31 and the second construction is shown in FIG. 4B.

Referring particularly to FIG. 4A, the first electrode element construction includes a case 35 made of a heat resistant, electrically insulating material. A ceramic material is preferred, although a glass or quartz material may also be employed for this purpose. A conductive metallic coating 36 is deposited inside the case 35 on its bottom and a thin layer 37 of powdered aluminum is laid down over this coating 36. A metal plate 38 which is shaped to follow the contours of the case 35 is inserted over the conductive layer 37, and an arcuate metal contact spring 39 is welded to the top surface of the plate 38 at its center. The metal plate 3 is retained in position by a silicon rubber adhesive 40.

Referring particularly to FIG. 4B, the second preferred construction of the electrode element also includes a case 35 made of a heat resistant, electrically insulating material. A conductive metallic coating 36 is deposited on the inside of the bottom of the case 35 and a metallic plate 38 rests against this coating 36. Welded to the plate is a metal sleeve 60 which extends upward therefrom to the brim of the case 35. A coiled contact spring 39B is disposed in the sleeve 60 with its lower end engaging the metal layer 36 and its upper end engaging the electrode bar 30. The contact spring 39B is under compression to provide a bias force which insures good electrical connections at each of its ends. A set of sleeves 60 and contact springs 39B may be employed along the length of large electrode elements 31 to insure even distribution of current along the discharge surface 32 with minimal resistive heating.

Referring again to FIGS. 2 and 3, when the finished electrode elements 31 are placed in position on the track 16, their contact springs 39 or 39B are compressed against the surface of the electrode bar 30. The force which results from this compression serves to enhance electrical contact between the electrode bar 30, the contact spring 39 or 39B, the metal plate 38, and the bottom wall of the case 35. When high voltage is applied to the bar electrode 30, the electric field is concentrated in the gap between the discharge surface 32 and the roller electrode 5. The corona which is produced in this treatment zone bombards the surface of web materials which are fed over the roller electrode 5. Heat generated during this treatment process is carried away by the cooling air which is circulated over the active discharge surface 32.

As shown best in FIG. 3, the electrode elements 31 are shaped to insure uniform treatment across their junction with an adjacent electrode element 31. The path of the web material as it is fed through the treatment zone is indicated by arrow 45. The end walls 46 of each electrode element 31 are aligned at an angle with respect to this feed path 45 and are shaped to mate closely with the end wall 46 of an adjacent electrode element 31. In the preferred embodiment the end walls 46 are planar and they are aligned at an angle of thirty degrees to the feed path. As a result, there is a region at the intersection of two adjacent electrode elements 31 where treatment is slightly reduced, but there is no abrupt or drastic change in treatment level across the entire width of the material.

In some applications it may be desired to provide regions which are untreated. This can easily be accommodated by removing the electrode elements 31 at the appropriate points across the width of the web. In the alternative, inactive elements which do not connect to the bar electrode 30 may be placed at the points where treatment is not required. An inactive element may be constructed by removing the contact spring 39 and metal plate 38 from an active electrode element 31. Such inactive elements cover the bar electrode 30 to provide an insulating barrier which prevents undesired arcing.

I claim:

1. A corona treater which comprises:
   a first conductive electrode for supporting a material to be treated in a treatment zone;
   a frame;
   a conductive electrode bar which is supported by the frame and which extends along the length of the first conductive electrode and is spaced therefrom;
   a track supported by the frame and formed from an electrically insulating material, the track extending along the length of the conductive electrode bar and being positioned adjacent thereto; and
   an electrode element slidably mounted to the track and having a brush contact which engages and makes electrical connection with the conductive electrode bar;
   wherein the electrode element is positioned along the track over the material to be treated to provide an active discharge surface at a desired location.

2. The corona treater as recited in claim 1 in which the electrode element includes a case formed from a heat resistant, electrically insulating material which is shaped to form a discharge surface that is directed toward the first electrode, and a pair of end surfaces which engage the end surfaces of other similar electrode elements mounted adjacent thereto on the track.

3. The corona treater as recited in claim 2 in which the material to be treated is moved through the treatment zone along a feed path, and the junction of the discharge surfaces on adjacent electrode segments is not co-planar with the feed path.

4. A corona treater station which comprises:
   a frame;
   a first electrode connected to the frame and providing support for sheet material which is fed through a treatment zone along a feed path;
   a track made of an electrically insulating material which is connected to the frame and which is positioned equidistantly from the first electrode along a portion of its length;
   an electrode bar mounted to the track and extending along the length of the track, the first electrode and the electrode bar being connected to the respective output terminals of a high voltage power supply; and
   a plurality of electrode elements which slidingly engage the track and are positioned side by side along a portion of its length, each electrode element including an active discharge surface which is directed toward the first electrode and a brush contact which electrically connects the electrode element to the electrode bar.

5. The corona treater station as recited in claim 4 in which the track includes a pair of spaced parallel rails and the active discharge surface of each electrode element is bounded by a pair of spaced support walls which are shaped to slidably engage the respective rails.

6. The corona treater station as recited in claim 5 in which the active discharge surface of each electrode element is also bounded by a pair of spaced end walls which engage the respective end walls of adjacent electrode elements, and in which these end walls are aligned at an angle with respect to the feed path.

7. The corona treater station as recited in claim 4 in which each electrode element is formed from a heat resistant, electrically insulating material and a conductive plate is disposed beneath its active discharge surface and is connected with its brush contact.

8. The corona treater station as recited in claim 7 in which the active discharge surface and the conductive plate are formed in the shape of a parallelogram.

9. The corona treater station as recited in claim 4 in which the frame includes a pair of spaced side assemblies and the first electrode is a circular cylindrical roller which extends between the side assemblies.

10. The corona treater station as recited in claim 9 in which the frame also includes a header that extends between the side assemblies and connects to the track, the header being rotatable between an operating position in which the track and attached electrode elements are directed toward the first electrode and a threading position in which the track and associated electrode elements are swung away from the first electrode.

11. The corona treater station as recited in claim 10 in which a pair of skirt members attach to the header and extend away therefrom along each side of the track to form an air pipe which communicates between the treatment zone and the interior of the header, and means is provided for drawing air from the treatment zone, through the air pipe and through the header to an exhaust.

* * * * *